US012724913B2

(12) United States Patent
Sofer et al.

(10) Patent No.: US 12,724,913 B2
(45) Date of Patent: Sep. 1, 2026

(54) DYNAMIC INTER-LAYER MAPPING OF SENSITIVE DATA

(71) Applicant: International Business Machines Corporation, Armonk, NY (US)

(72) Inventors: Oded Sofer, Midreshet Ben Gurion (IL); Shlomit Avrahami Tomer, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 18/947,108

(22) Filed: Nov. 14, 2024

(65) Prior Publication Data

US 2026/0134129 A1 May 14, 2026

(51) Int. Cl.
*G06F 21/62* (2013.01)
*G06F 16/23* (2019.01)
*G06F 16/28* (2019.01)

(52) U.S. Cl.
CPC ...... *G06F 21/6218* (2013.01); *G06F 16/2322* (2019.01); *G06F 16/285* (2019.01)

(58) Field of Classification Search
CPC .......... G06F 21/50; G06F 21/52; G06F 21/54; G06F 21/62; G06F 21/6218
See application file for complete search history.

(56) References Cited

U.S. PATENT DOCUMENTS 8,370,362 B2 2/2013 Szabo
11,030,184 B2 6/2021 Konkimalla et al.
11,049,056 B2 6/2021 Rosenthal et al.
11,138,095 B2 10/2021 Ben-Natan et al.
11,200,338 B2 12/2021 Hoa
11,263,335 B2 3/2022 Parthasarathy
11,416,631 B2 8/2022 Sofer et al.
(Continued)

FOREIGN PATENT DOCUMENTS

CN 115859270 A 3/2023

OTHER PUBLICATIONS

Brereton, “The Ultimate Guide to Tracking User Activity in Web Applications”, launchnotes.com, https://www.launchnotes.com/blog/the-ultimate-guide-to-tracking-user-activity-in-web-applications, May 17, 2024, 15 pages.

*Primary Examiner* — Daniel B Potratz
(74) *Attorney, Agent, or Firm* — CANTOR COLBURN LLP; Stosch Sabo

(57) ABSTRACT

A technique of inter-layer mapping of sensitive data includes monitoring execution of an application providing an application interface through which a user can access a database. Monitoring execution of the application includes noting data fields of the application interface in which data is presented. The technique also includes monitoring accesses to the database made by a database management system based on user interaction with the application interface and determining mappings between the data fields of the application interface and object-fields in the database based on the monitoring of execution of the application and monitoring of accesses to the database. Based on the mappings, sensitive data in the database is identified by performing classification processing. A data access policy governing access to the database is updated based on the identification of sensitive data in the database.

20 Claims, 3 Drawing Sheets

(56) References Cited

U.S. PATENT DOCUMENTS

| | | | | |
|---|---|---|---|---|
| 2013/0174215 | A1* | 7/2013 | Mattsson | G06F 21/604 726/1 |
| 2017/0093878 | A1* | 3/2017 | Rodniansky | G06F 21/85 |
| 2019/0361933 | A1* | 11/2019 | Rogynskyy | G06Q 10/107 |
| 2021/0271769 | A1* | 9/2021 | Poirel | H04L 63/1425 |
| 2024/0303358 | A1* | 9/2024 | Kulkarni | G06F 21/6218 |
| 2026/0099618 | A1* | 4/2026 | Noor | G06F 21/6218 |

* cited by examiner

DYNAMIC INTER-LAYER MAPPING OF SENSITIVE DATA

BACKGROUND OF THE INVENTION

The present invention relates in general to data processing, and more specifically, to data management and security. Still more particularly, the present invention relates to dynamic inter-layer mapping of sensitive data.

Digital asset management (DAM) is a software-implemented process that enables organizations to manage, store, and share digital assets, particularly those that include rich media such as images, videos, and audio files. DAM software typically provides a centralized repository that stores the managed digital assets in a secure and structured environment providing features like version control, metadata management, and search and retrieval.

Data Security Posture Management (DSPM) is a cybersecurity technology that can be implemented in conjunction with DAM to provide automated protection of data from unauthorized access, loss, or misuse. DSPM can be a critical component of a distributed computing infrastructure in that it protects data in cloud environments in which sensitive data may be distributed spread across multiple clouds and storage technologies. DSPM focuses on protecting the data directly, rather than securing the devices, systems, and applications in the distributed computing infrastructure.

SUMMARY OF THE INVENTION

In accordance with one or more embodiments, a computer-implemented method, system, and computer program product are contemplated to perform a technique of inter-layer mapping of sensitive data includes monitoring execution of an application providing an application interface through which a user can access a database. Monitoring execution of the application includes noting data fields of the application interface in which data is presented. The technique also includes monitoring accesses to the database made by a database management system based on user interaction with the application interface and determining mappings between the data fields of the application interface and object-fields in the database based on the monitoring of execution of the application and monitoring of accesses to the database. Based on the mappings, sensitive data in the database is identified by performing classification processing. A data access policy governing access to the database is updated based on the identification of sensitive data in the database.

Figure 1:
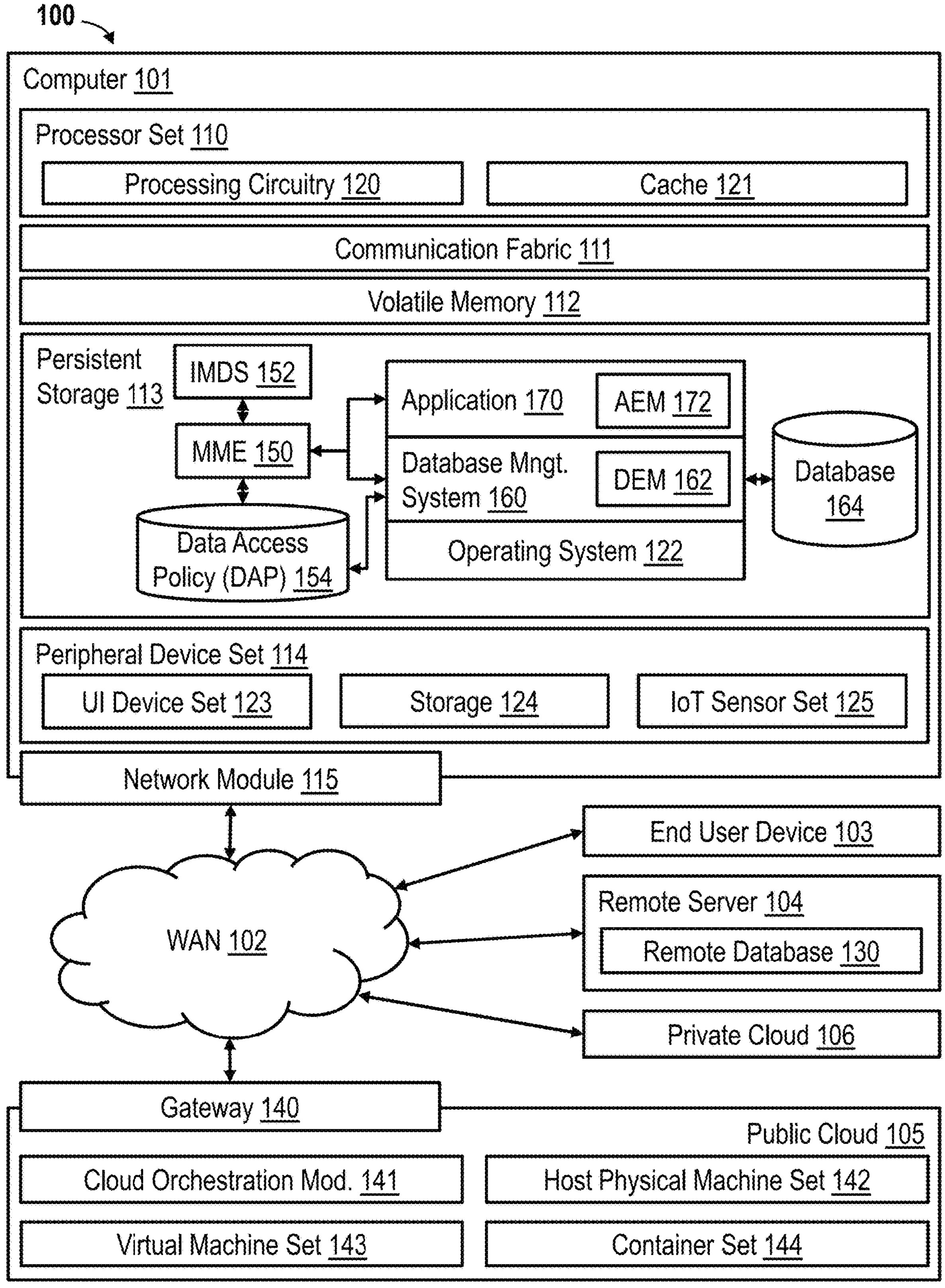
FIG. 1 is a high-level block diagram of an exemplary data processing environment in accordance with one or more embodiments.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, computing environment 100 contains an example of an environment for the execution of at least some of the computer code, such as a multilayer matching engine (MME) 150, involved in performing the inventive methods. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and other code and data), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be implemented in MME 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in MME 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network, including the Internet, capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from WAN 102 entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Still referring to FIG. 1, in an exemplary embodiment of computing environment 100, operating system 122 supports execution of a database management system (DBMS) 160, which can support access and management of at least one structured query language (SQL) or noSQL database 164. Database 164 can comprise multiple data structure and/or data collections, and further, can include both sensitive data and non-sensitive data. Non-limiting examples of sensitive data include personally identifying information (PII), personal health information (PHI), customer names, payment information, account information, date of birth (DOB), governmental identifiers (tax identifiers, license numbers, etc.), usernames, passwords, two-factor authentication (2FA) information, biometric information, and trade secret information. Sensitive data can be formatted or expressed in one or more data formats, including as alphanumeric strings, patterns, graphics, images, gestural information, etc. DBMS 160 has an associated database event monitor (DEM) 162 that tracks requests and responses made to database 164. In various embodiments, DEM 162 can be integrated with DBMS 160 or can alternatively or additionally be implemented as a separate software tool. DBMS 160 is communicatively coupled to access a data access policy (DAP) 154, which specifies allowed and/or disallowed accesses to data within database 164 by various users of computing environment 100.

Operating system 122 additionally supports execution of a user application 170. Application 170 can include, for example, a graphical and/or textual user interface through which a user can interact with DBMS 160 in order to access database 164. For example, in one embodiment, application 170 can include a known or future-developed browser interface. Application 170 has an associated application event monitor (AEM) 172 that tracks user interaction with application 170. In various embodiments, AEM 172 can be integrated with application 170 or can alternatively or additionally be implemented as a separate software tool.

MME 150 is a software tool that facilitates the identification of sensitive data in database 164 by mapping specific input and/or output data fields of application 170 to object-fields in database 164 utilized by DBMS 160 to store sensitive data. As noted above, a user (e.g., a data access policy administrator) is likely to be unable to directly specify object-fields in database 164 containing sensitive data because data values and object-field labels in database 164 may not be stored in a format that is human-readable or easily recognizable. MME 150 accordingly creates an inter-layer mapping data structure (IMDS) 152 that specifies a correspondence between the application data fields of application 170 and object-fields of database 164. Based on IMDS 152, MME 150 may additionally update data access policy 154 to control access to sensitive data identified in database 164.

DAM and DSPM software monitor activities at the data layer, while other security solutions such as web application firewall (WAF) and at least some security information and event management (SIEM) tools monitor at the application layer. As a result of the different layers at which monitoring is applied, a gap can exist between security products that can impair insight into data activities, risks, and control.

In DAM, one of the crucial steps in data protection and one of the fundamental requirements of most regulations is to identify all sensitive data, specify the location of the data, and control and audit the Access Control Level (ACL), activities, and changes to the data.

The nature of sensitive data can vary greatly and may depend on the particular operations of each organization. Sensitive data can include personal information of customers, as well as confidential business data. In some cases, regular expression (RegEx) pattern matching, context search, and natural language processing (NLP) can be employed to identify sensitive data, but in some cases none of the known techniques is successful (e.g., if the sensitive data is a number or string with no unique identifier). In such cases, the data protection software must receive user input to enable patterns and/or or rules to be built to automate identification of the sensitive data.

Despite the importance of discovering sensitive data across multiple software layers, most organizations face significant challenges in doing so. For example, one obstacle is the difficulty for users to provide the information necessary to identify sensitive data. While it can be relatively simple for users to identify such data at the application layer, users often experience greater difficulty in specifying the parameters for a sensitive data at the data layer. For example, at the data layer, a column name in a database table may not be in a human language and/or the data itself may not have specific human-recognizable pattern. In contrast, at the application layer, a graphical user interface (GUI) often provides labels for database fields that are intuitive to human users. Moreover, in many cases, the users of security systems at the application layer may not have access to security systems at the data layer, particularly if a Separation of Duty (SoD) policy is implemented.

As a result of the foregoing challenges, implementation of DAM and DSPM systems to identify sensitive data and monitor events related to the sensitive data at the data layer is challenging and time-intensive.

Figure 2:
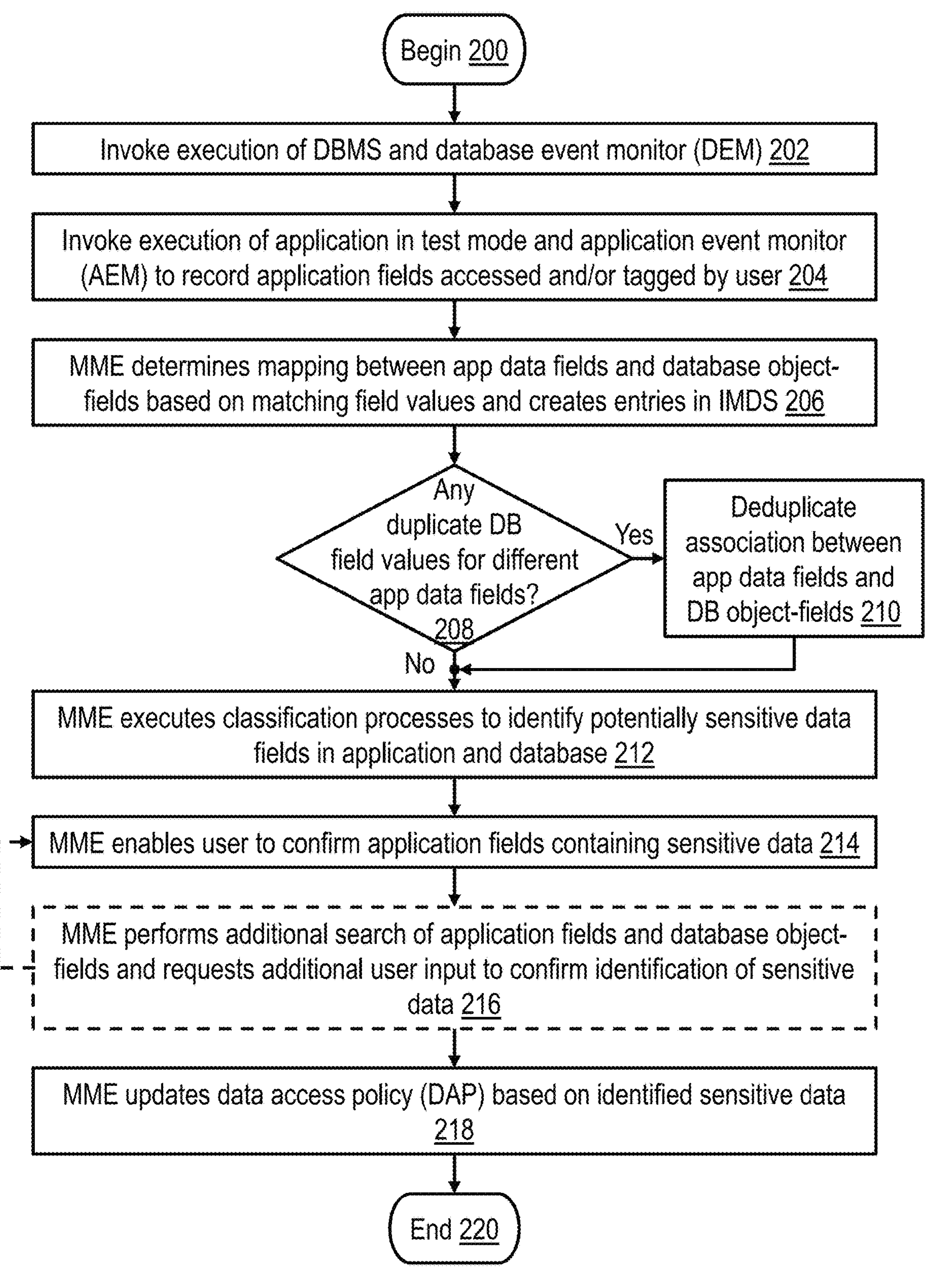
FIG. 2 is a high-level logical flowchart of an exemplary process for inter-layer mapping of sensitive data in accordance with one or more embodiments.

Referring now to FIG. 2, there is depicted a high-level logical flowchart of an exemplary process for inter-layer mapping of sensitive data in accordance with one or more embodiments. The illustrated process can be performed, for example, by execution of program instructions, including those of MME 150, by processing circuitry 120 of a computer 101 as shown in FIG. 1.

The process of FIG. 2 begins at block 200 and thereafter proceeds to block 202, which illustrates a user invoking execution of DBMS 160 and DEM 162. DEM 162 detects all access commands of DBMS 160 to database 164 and all responses of database 164 to such access commands and preferably builds records (e.g., in a treemap data structure) recording objects-commands-fields-values referenced by access commands. For example, for a SQL database 164, a data structure entry may take the form {timestamp, dbName, dbTableName, dbFieldName, dbFieldValue}, where timestamp is a timestamp of the access to database 164, dbName is the name of the accessed database 164, dbTableName is the name of the table accessed in database 164, dbFieldName is the name of an accessed field in dbTableName, and dbFieldValue is the data value of dbFieldName.

At block 204, the user invokes execution of application 170 in a test mode (if available) and additionally invokes execution of AEM 172. AEM 172 detects all data fields of all types in the various screens of application 170 and extracts the data values for all the identified data fields. For example, AEM 172 may create records of the form {appName, screenTitle, appFieldName, appFieldValue}, where appName is the name of application 170, screenTitle is the name of a screen of application 170 containing a data field, appFieldName is the name of an input or output data field presented in screenTitle, and appFieldValue is the data value of appFieldName. In at least some embodiments, AEM 172 additionally permits the user to explicitly tag data fields of application 170 recognized by the user as containing sensitive data. For example, in one embodiment in which application 170 presents a browser interface, AEM 172 may include a browser extension that enables a user to tag GUI fields through use of a shortkey (e.g., Ctrl+Shift+LeftKey) or selection of one or more graphical controls presented overlaid over a screen of application 170 adjacent data fields of the screen.

MME 150 is additionally executed to create mappings between data fields in application 170 and object-fields in database 164 and record those mappings in IMDS 152 (block 206). In at least one embodiment, MME 150 determines mapping between application data fields and database object-fields based on matches between dbFieldValues and appFieldValues and creates a respective entry in IMDS 152 for any one-to-one correspondence between an application data field and a database object-field. In some cases, multiple database object-fields corresponding to different application data fields may share a common data value. MME 150 preferably detects such occurrences, if any (block 208).

In response to MME 150 not detecting any instances of multiple database object-fields that have a common data value and that correspond to different application data fields, the process proceeds from block 208 to block 212, which is described below. If, however, MME 150 detects multiple database object-fields that have a common data value and that correspond to different application data fields, MME 150 deduplicates the association between application data fields and database object-fields (block 210). In at least some embodiments, MME 150 can autonomously deduplicate the associations utilizing natural language processing (NLP) and/or fuzzy search techniques. In at least some embodiments, MME 150 may flag any remaining unresolved duplicates, store the unresolved duplicates, and repeat deduplication processing after processing additional screens of application 170. Alternatively or additionally, MME 150 may request user input to resolve the duplicates. Following block 210, the process of FIG. 2 passes to block 212.

Block 212 illustrates MME 150 executing one or more classification processes to identify (classify) data fields in application 170 and object-fields of database 164 that contain potentially sensitive data based on the entries of IMDS 152. For example, the classification processes can classify data as potentially sensitive data based on alphanumeric patterns (e.g., identified by regular expressions (RegEx)), column names, and/or NLP. MME 150 can then permit the user to confirm which of the data fields containing potentially sensitive data actually contain sensitive data, for example, through presentation of a user-editable list of application data fields, through presentation of user-selectable graphical markings in a GUI screen of application 170, or the like (block 214).

Figure 3:
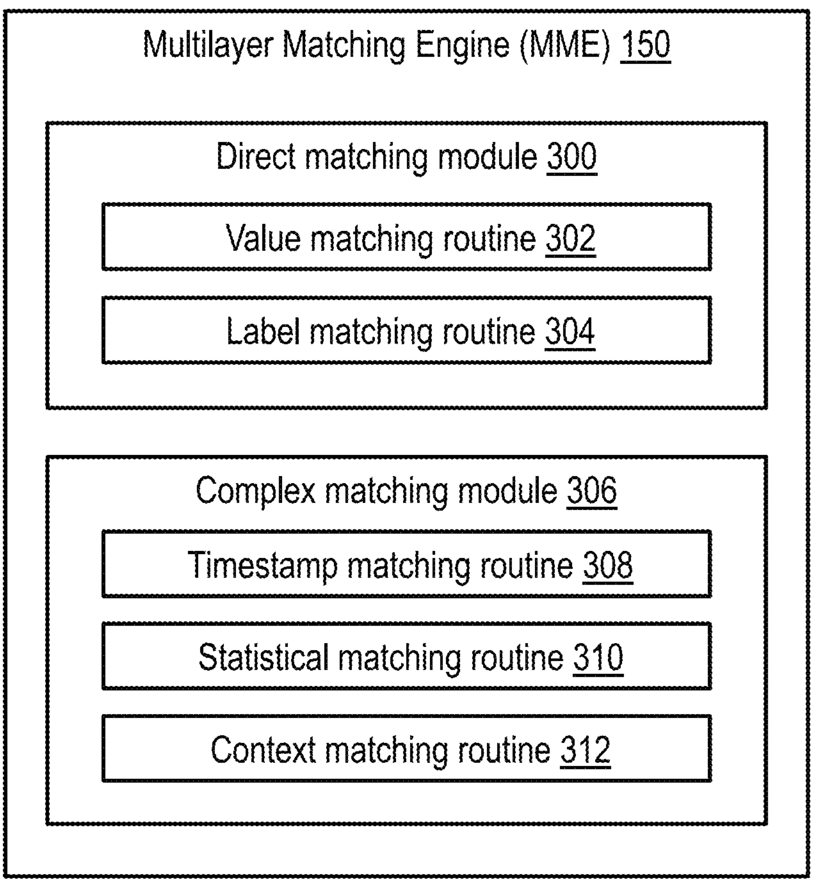
FIG. 3 is a high-level block diagram of an exemplary embodiment of a multilayer matching engine (MME) in accordance with one or more embodiments.

The process proceeds from block 214 to optional block 216, which illustrates that MME 150 can iteratively perform one or more additional searches to identify additional data fields in application 170 and/or object-fields in database 164 containing sensitive data. FIG. 3 illustrates that in at least some embodiments, MME 150 supports multiple different matching modules that can employ one or more techniques that can by employed independently and/or in combination to identify application data fields and database object-fields that contain potentially sensitive data at block 216. For example, in the depicted example, MME 150 includes a direct matching module 300 and a complex matching module 306. Direct matching module 300 employs a value matching routine 302 and/or a label matching routine 304 to identify application data fields and database object fields that have a one-to-one correspondence that contain potentially sensitive data. In one embodiment, value matching routine 302 automatically forms a RegEx satisfied by data values of previously identified sensitive data and performs a fuzzy and/or stemmed search for other data values of application data fields and/or database object-fields having the same or similar RegEx. Label matching routine 304 is predicated on the observation that, ideally, a one-to-one mapping will exist between the data model of application 170 and that of DBMS 160. If the data models correspond, label matching routine 304 can perform a fuzzy and/or stemmed search to identify additional potentially sensitive data by finding additional labels of data fields in application 170 and/or object-fields of database 164 that precisely or closely match labels of data fields previously identified as containing sensitive data.

Complex matching module 306 includes a timestamp matching routine 308, a statistical matching routine 310, and a context matching routine 312. Timestamp matching routine 308 identifies data fields in application 170 and/or object-fields in database 164 containing potentially sensitive data by comparing timestamps of data presentation and data input events captured by AEM 172 and queries and responses of DBMS 160 to database 164 captured by DEM 162. Based on the chronological proximity of the events captured by AEM 172 and DEM 162, MME 150 can infer that object-fields in database 164 accessed based on an data presentation or data input event for application 170 involving potentially sensitive data contain potentially sensitive data. MME 150 employs statistical matching routine 310 to apply statistical models to derive mappings between logical components of application 170 and corresponding object-fields in database 164 over a large number of iterations of data accesses. By iteratively assessing the correlations between application data and database object fields, statistical matching routine 310 progressively enhances its matching accuracy over time. Context matching routine 312 can take into account one or more types of context over one or more sample application screens to suggest potentially sensitive data. These types of context can include, for example, logical proximity in database 164 (e.g., columns adjacent to known sensitive data in a database table), proximity of data fields in application 170 (e.g., data fields on the same screen as known sensitive data), user identifier initiating a data access, session identifier, etc. Those skilled in the art will appreciate that any of the matching techniques applied at block 216 can be applied in other blocks of the process of FIG. 2, including at block 212.

Following block 216 (or if optional block 216 is omitted, following block 214), MME 150 updates data access policy 154 to appropriately control and/or restrict access to sensitive data (block 218). The update to data access policy 154 can determine what screens, data fields, and/or data values of application 170 are accessible by and/or visible to different users of database 164, for example, based on user permissions, user roles, geographic restrictions, customer/enterprise restrictions, need-to-know (NTK) restrictions, etc. Following block 218, the process of FIG. 2 ends at block 220.

As has been described, according to one or more embodiments, a technique of inter-layer mapping of sensitive data includes monitoring execution of an application providing an application interface through which a user can access a database. Monitoring execution of the application includes noting data fields of the application interface in which data is presented. The technique also includes monitoring accesses to the database made by a database management system based on user interaction with the application interface and determining mappings between the data fields of the application interface and object-fields in the database based on the monitoring of execution of the application and monitoring of accesses to the database. Based on the mappings, sensitive data in the database is identified by performing classification processing. A data access policy governing access to the database is updated based on the identification of sensitive data in the database.

While the present invention has been particularly shown as described with reference to one or more preferred embodiments, it will be understood by those skilled in the art that various changes in form and detail may be made therein without departing from the spirit and scope of the invention.

The following definitions are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, system or apparatus that comprises a list of elements is not necessarily limited to only those elements but can include other elements not expressly listed or inherent to such composition, mixture, process, method, article, system or apparatus.

Additionally, the term "exemplary" is used herein to mean "serving as one example, instance or illustration." Any embodiment or design described herein as "exemplary" is not necessarily to be construed as preferred or advantageous over other embodiments or designs. The terms "at least one" and "one or more" shall be understood to include any integer number greater than or equal to one, and the term "plurality" shall be understood to include any integer number greater than or equal to two. The term "coupled" shall include both indirect connection and a direct connection, unless specified otherwise in a particular case. The terms "about," "substantially," "approximately," and variations thereof, are intended to include the degree of error associated with measurement of the particular quantity based upon the equipment available at the time of filing the application. For example, "about" can include a range of ±10%, or ±5%, or ±2% of a given value.

The figures described herein and the written description of specific structures and functions are not presented to limit the scope of what applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. For the sake of brevity, conventional techniques related to making and using aspects of the invention(s) may or may not be described in detail herein, and many conventional implementation details are only mentioned briefly or are omitted entirely. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A computer-implemented method of inter-layer mapping of sensitive data, the method comprising:

processing circuitry monitoring execution of an application providing an application interface through which a user can access a database, wherein monitoring execution of the application includes noting data fields of the application interface in which data is presented;

the processing circuitry monitoring accesses to the database made by a database management system based on user interaction with the application interface;

the processing circuitry determining mappings between the data fields of the application interface and object-fields in the database based on the monitoring of execution of the application and monitoring of accesses to the database;

based on the mappings, the processing circuitry identifying sensitive data in the database by performing classification processing; and the processing circuitry updating a data access policy governing access to the database based on the identification of sensitive data in the database.

2. The method of claim 1, wherein determining mappings includes determining the mappings based on matches between data values of data fields of the application interface and object-fields of the database.

3. The method of claim 1, further comprising:

the processing circuitry deduplicating potential mappings between data fields of the application interface and object-fields in the database.

4. The method of claim 1, wherein performing classification processing includes performing classification based on data patterns detected utilizing regular expressions.

5. The method of claim 1, wherein performing classification processing includes performing classification based on database column names.

6. The method of claim 1, wherein performing classification processing includes performing classification utilizing natural language processing.

7. The method of claim 1, further comprising the processing circuitry identifying additional sensitive data by:

determining a regular expression satisfied by known sensitive data; and applying the regular expression to additional data within the database.

8. The method of claim 1, further comprising:

the processing circuitry identifying additional sensitive data utilizing at least one selected from a group consisting of: timestamp matching between application events and database events, statistical matching, and context matching.

9. A computer program product, comprising:

one or more computer-readable storage media; and program instructions stored on the one or more computer-readable storage media to perform computer operations for inter-layer mapping of sensitive data, the computer operations including:

monitoring execution of an application providing an application interface through which a user can access a database, wherein monitoring execution of the application includes noting data fields of the application interface in which data is presented;

monitoring accesses to the database made by a database management system based on user interaction with the application interface;

determining mappings between the data fields of the application interface and object-fields in the database based on the monitoring of execution of the application and monitoring of accesses to the database;

based on the mappings, identifying sensitive data in the database by performing classification processing; and updating a data access policy governing access to the database based on the identification of sensitive data in the database.

10. The computer program product of claim 9, wherein determining mappings includes determining the mappings based on matches between data values of data fields of the application interface and object-fields of the database.

11. The computer program product of claim 9, wherein the computer operations include:

deducting potential mappings between data fields of the application interface and object-fields in the database.

12. The computer program product of claim 9, wherein performing classification processing includes performing at least one selected from a group consisting of: classifying based on data patterns detected utilizing regular expressions, classifying based on database column names, and classifying utilizing natural language processing.

13. The computer program product of claim 9, wherein the computer operations include identifying additional sensitive data by:

determining a regular expression satisfied by known sensitive data; and applying the regular expression to additional data within the database.

14. The computer program product of claim 9, wherein the computer operations include:

identifying additional sensitive data utilizing at least one selected from a group consisting of: timestamp matching between application events and database events, statistical matching, and context matching.

15. A data processing system, comprising:

processing circuitry; and one or more computer-readable storage media communicatively coupled to the processing circuitry, wherein the one or more computer-readable storage media includes program instructions to perform operations including:

monitoring execution of an application providing an application interface through which a user can access a database, wherein monitoring execution of the application includes noting data fields of the application interface in which data is presented;

monitoring accesses to the database made by a database management system based on user interaction with the application interface;

determining mappings between the data fields of the application interface and object-fields in the database based on the monitoring of execution of the application and monitoring of accesses to the database;

based on the mappings, identifying sensitive data in the database by performing classification processing; and updating a data access policy governing access to the database based on the identification of sensitive data in the database.

16. The data processing system of claim 15, wherein determining mappings includes determining the mappings based on matches between data values of data fields of the application interface and object-fields of the database.

17. The data processing system of claim 15, wherein the operations include:

deduplicating potential mappings between data fields of the application interface and object-fields in the database.

18. The data processing system of claim 15, wherein performing classification processing includes performing at least one selected from a group consisting of: classifying based on data patterns detected utilizing regular expressions, classifying based on database column names, and classifying utilizing natural language processing.

19. The data processing system of claim 15, wherein the operations include identifying additional sensitive data by:

determining a regular expression satisfied by known sensitive data; and applying the regular expression to additional data within the database.

20. The data processing system of claim 15, wherein the operations include:

identifying additional sensitive data utilizing at least one selected from a group consisting of: timestamp matching between application events and database events, statistical matching, and context matching.

* * * * *